US008708316B2

(12) United States Patent
Sadinsky et al.

(10) Patent No.: US 8,708,316 B2

(45) Date of Patent: Apr. 29, 2014

(54) LOCK FOR A PORTABLE PROTECTIVE FENCE

(75) Inventors: Steven E. Sadinsky, Van Nuys, CA (US); Stuart Long, Camarillo, CA (US)

(73) Assignee: Guardian Pool Fence Systems, Inc., Van Nuys, CA (US)

(*) Notice: Subject to any disclaimer, the term of this patent is extended or adjusted under 35 U.S.C. 154(b) by 0 days.

(21) Appl. No.: 13/087,205

(22) Filed: Apr. 14, 2011

(65) Prior Publication Data

US 2012/0261630 A1 Oct. 18, 2012

(51) Int. Cl.

| | |
|---|---|
| ***E04H 17/00*** | (2006.01) |
| ***E04H 17/20*** | (2006.01) |
| ***E04H 17/22*** | (2006.01) |

(52) U.S. Cl.

CPC ................ *E04H 17/20* (2013.01); *E04H 17/22* (2013.01)

USPC .......................................... 256/65.14; 256/26

(58) Field of Classification Search

CPC ................................ E04H 17/20; E04H 17/22

USPC ..... 256/65.14, DIG. 2, DIG. 4, DIG. 6, 1, 26; 52/170, 298, 704; 248/219.2, 248/354.4–354.6

See application file for complete search history.

(56) References Cited

U.S. PATENT DOCUMENTS

| | | | | | |
|---|---|---|---|---|---|
| 155,235 | A * | 9/1874 | Goldsmith | .................... | 135/118 |
| 173,144 | A * | 2/1876 | Van Dorn | ........................ | 256/22 |
| 242,190 | A * | 5/1881 | Dubois | ........................... | 256/24 |
| 266,453 | A * | 10/1882 | Fogus | ............................. | 49/365 |
| 291,346 | A * | 1/1884 | Hodgen | .......................... | 52/116 |
| 413,131 | A * | 10/1889 | Chappell | ....................... | 248/514 |
| 413,833 | A * | 10/1889 | Pike | ............................. | 254/256 |
| 416,718 | A * | 12/1889 | Cummings | ..................... | 52/151 |
| 457,323 | A * | 8/1891 | Matthews | ....................... | 114/91 |
| 633,497 | A * | 9/1899 | Zickefoose | ..................... | 403/93 |
| 3,093,363 | A * | 6/1963 | Bohon | ............................ | 256/26 |
| 4,140,416 | A | 2/1979 | Parisien | | |
| 4,255,913 | A | 3/1981 | Poma | | |
| 4,413,361 | A | 11/1983 | Wolf et al. | | |
| 4,671,495 | A * | 6/1987 | Garland et al. | .............. | 256/12.5 |
| 5,364,076 | A * | 11/1994 | Nicholls | ......................... | 256/22 |
| 5,586,423 | A | 12/1996 | Mullen | | |
| 6,053,281 | A * | 4/2000 | Murray | ......................... | 182/113 |
| 6,141,928 | A | 11/2000 | Platt | | |
| 6,866,251 | B2 | 3/2005 | Rosaen | | |
| 7,055,807 | B2 | 6/2006 | Pesta | | |
| 7,306,203 | B2 | 12/2007 | Platt | | |
| 7,334,957 | B2 | 2/2008 | Sadinsky et al. | | |
| 7,377,491 | B2 | 5/2008 | Fuoco | | |
| 7,721,476 | B2 | 5/2010 | Tumlinson et al. | | |
| 7,722,014 | B2 * | 5/2010 | Godwin | ..................... | 256/65.14 |
| 2008/0230756 | A1 * | 9/2008 | Neame et al. | ..................... | 256/1 |

* cited by examiner

*Primary Examiner* — Victor MacArthur

(74) *Attorney, Agent, or Firm* — Christie, Parker & Hale, LLP

(57) ABSTRACT

A lock for a fence, the lock including a seat having an opening configured to receive a socket and a lock plate rotatably coupled to the seat and configured to be coupled to a fence pole protruding from the socket.

11 Claims, 5 Drawing Sheets

14
54
54
56
58
12
42
20

14
10
42
12

34
14
12
42
10
32

44
14
44
38
36
40

12
16
22
18
30
28
26
24
26

70
14
54
54
56
58
12
42
20
72
74
76

20
14
10
12

LOCK FOR A PORTABLE PROTECTIVE FENCE

FIELD

Embodiments of the present invention generally relate to a lock, and more specifically to a lock for a portable protective fence.

BACKGROUND

Recently, a need has been recognized for a type of portable fence that can be set up relatively quickly and "locked" in place so as to be difficult to remove without a tool, yet still can be dismantled relatively quickly. Such a fence may be used, for example, at a construction site or around a pool wherein the fence can be prevented from being removed simply by lifting the fence poles out of the ground, yet can be removed easily with a tool, such as a screw driver.

For example, a swimming pool fence exists that is difficult for a small child to climb and is weather resistant, yet may be removed for uninterrupted use of the swimming pool. These fences employ a number of rigid or slightly flexible poles of steel, aluminum or fiberglass which are set in holes in a pool decking approximately two feet from the edge of the pool. The poles are located at approximately a 30-36 inch spacing.

Tensioned between the poles is a mesh screen having a binding top and bottom and sufficient tensile strength so that a person cannot easily enlarge the mesh openings to force a way through the fence. Further, there are no footholds or handholds for a child to climb the fence. The bound upper edge of the fence prevents fraying of the mesh, but does not provide a handhold or sufficient rigidity to aid a child to climb over the fence, even if the child can reach to the top of the fence. The instability of the top binding acts as a deterrent for the child even if he or she is able to reach the top of the fence.

The fence may be opened to allow swimmers to enter and leave the pool area by unlatching a section which acts as a gate, usually with a spring-loaded hook and eye fastener and then by lifting one pole out of its deck socket. The pole must be reinserted and the latch hooked for each entry and departure from the pool area. More elaborate gates have also been developed.

When the pool is used without the fence, each of the poles may be pulled in sequence from their socket and the fabric fencing material and poles are rolled to form a compact structure. Reassembly of the fence starts by inserting the first pole, hooking it to a rigid structure and extending each pole in the section in sequence to another rigid structure or back to the original pole to complete a closed circuit. Each section is then tensioned with a fastener connecting each fence section to the next section.

Recently, fences have been developed that allow the fence poles to be removably locked into a socket inserted into a pool deck hole. The locking feature allows the fence poles to be more securely maintained in the pool deck while still allowing the poles to be easily removed. On a conventional lockable fence, a release button is provided on the fence poles to allow a user to disengage the lock from the pole socket by merely pressing the button. Thus, ease and convenience of removal has been valued over security, and such fences are still considered removable and not "permanent." To be considered a "permanent" fence, building codes require that a tool be necessary to disassemble the fence. A permanent fence structure exists that includes a lock having a "release button" characteristic that can be screwed into a fence pole to prevent the fence from being removed from the ground or from a socket and unscrewed to act as a release button, allowing the fence to be removed. Such a fence is described in U.S. Pat. No. 7,334,957 to Sadinsky.

SUMMARY

According to an embodiment of the present invention, a lock for a fence is provided, the lock including a seat having an opening configured to receive a socket; and a lock plate rotatably coupled to the seat and configured to be coupled to a fence pole protruding from the socket.

In one embodiment, the lock plate is coupled to the seat by a pin. Further, the seat and the lock plate may each have a hinge portion, and wherein the pin extends through the hinge portion on the seat and the hinge portion on the lock plate. In one embodiment, the hinge portion on the seat and the hinge portion on the lock plate are substantially cylindrical and have a hinge opening extending therethrough. Additionally, the cylindrical section of the seat and the cylindrical section of the lock plate may each have an outer diameter that is greater than a thickness of the seat and of the lock plate, respectively.

In one embodiment, the lock plate has a fastener opening adapted to receive a fastener to couple the lock plate to a fence pole. Additionally, in one embodiment, the seat and the lock plate are made from the same material, for example a glass and nylon composite.

In another embodiment, a fence is provided including a plurality of fence poles; a material tensioned between the fence poles; at least one socket for accommodating one of the fence poles; and a lock comprising a seat having an opening through which the at least one socket extends and a lock plate rotatably coupled to the seat and coupled to the fence poles accommodated in the at least one socket.

In another embodiment, a method is provided for locking a fence, the method including inserting a socket through an opening in a lock, the lock comprising a seat having the opening and a lock plate rotatably coupled to the seat; inserting the socket into the ground; inserting a fence pole into the socket; and coupling the lock plate to the fence pole. In one embodiment, coupling the lock plate to the fence pole includes inserting a screw through a fastener hole in the lock plate and into a fastener opening in the fence.

DETAILED DESCRIPTION

Generally, embodiments of the present invention are directed to a lock configured to be coupled to a socket and to a fence pole of a portable protective fence to "permanently" couple the fence pole to the socket. Although the fence pole and the socket can be uncoupled, such uncoupling requires a tool, such as a screwdriver. Often, portable fences are erected by inserting fence poles directly into holes drilled in the ground or inserting fence poles containing pins having a smaller diameter than the fence poles into, the holes containing sockets configured to receive the fence poles. Additionally, an embodiment of a lock of the present invention can be used to more permanently couple the fence pole to the socket to prevent the fence pole from being removed from the socket. With respect to embodiments of the lock of the present invention, the socket can be inserted through an opening in the lock and then the socket and lock can be inserted into a drilled hole in, for example, a pool deck or in another appropriate place. A fence pole for supporting the fence is inserted into each socket and the lock can be coupled to a respective fence pole by fasteners, thereby preventing the fence pole from being removed from the socket unless a tool is used to remove the fastener from the pole.

Figures 1, 2:
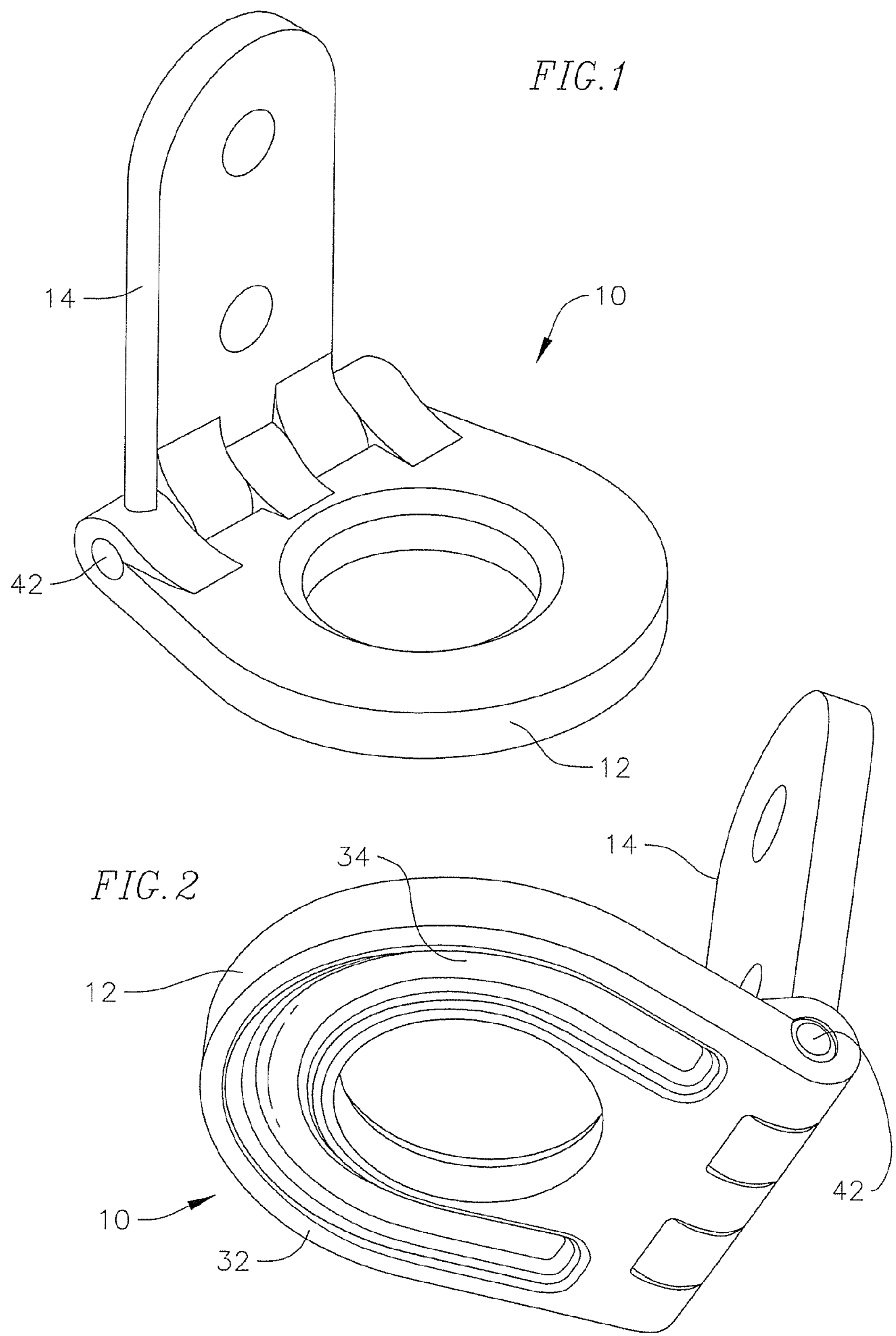
FIG. 1 is a top perspective view of an embodiment of a lock of the present invention.
FIG. 2 is a bottom perspective view of the lock of FIG. 1.
Figures 3, 4:
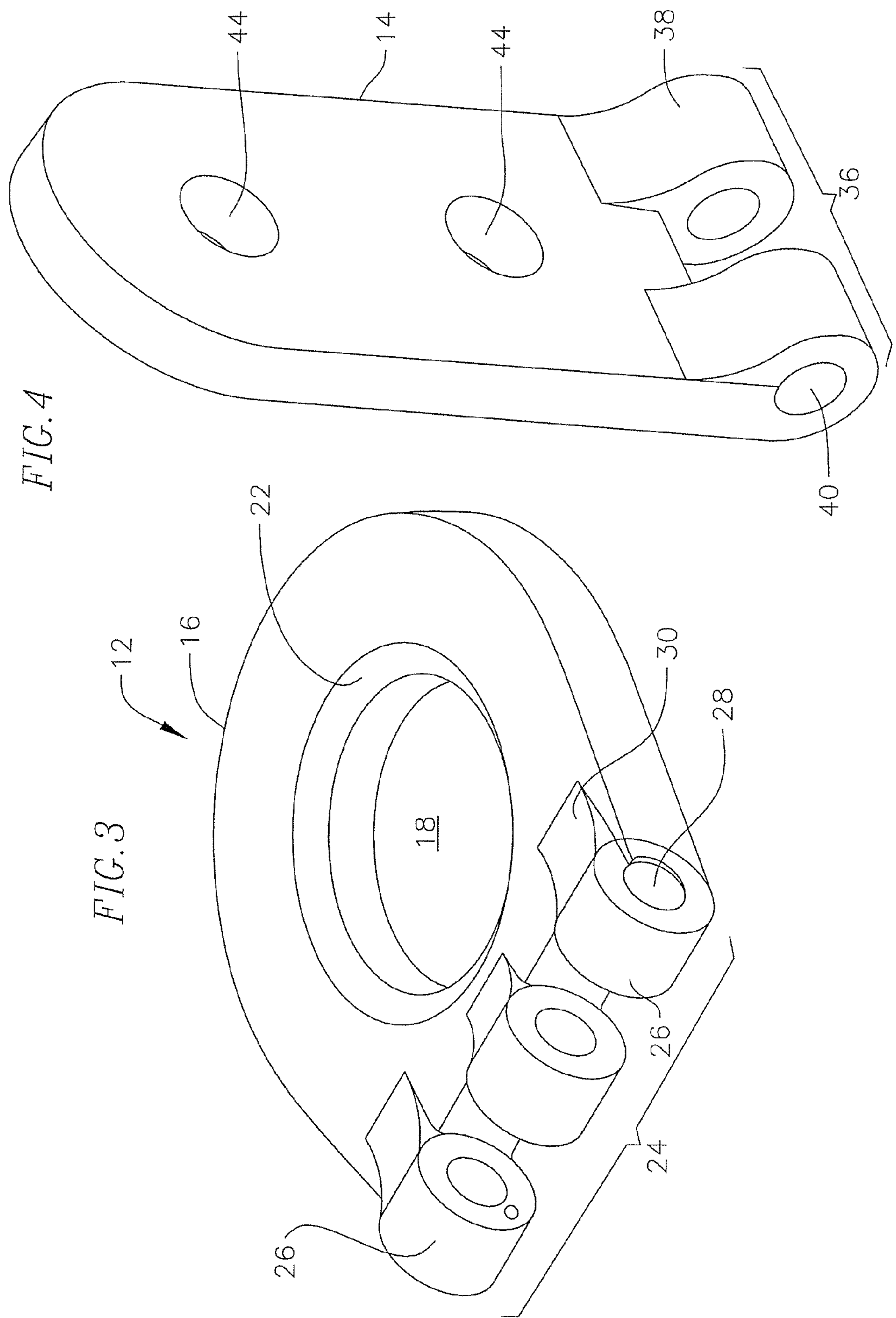
FIG. 3 is a perspective view of an exemplary seat of the lock of FIG. 1.
FIG. 4 is a perspective view of an exemplary lock plate of the lock of FIG. 1.
Figure 5:
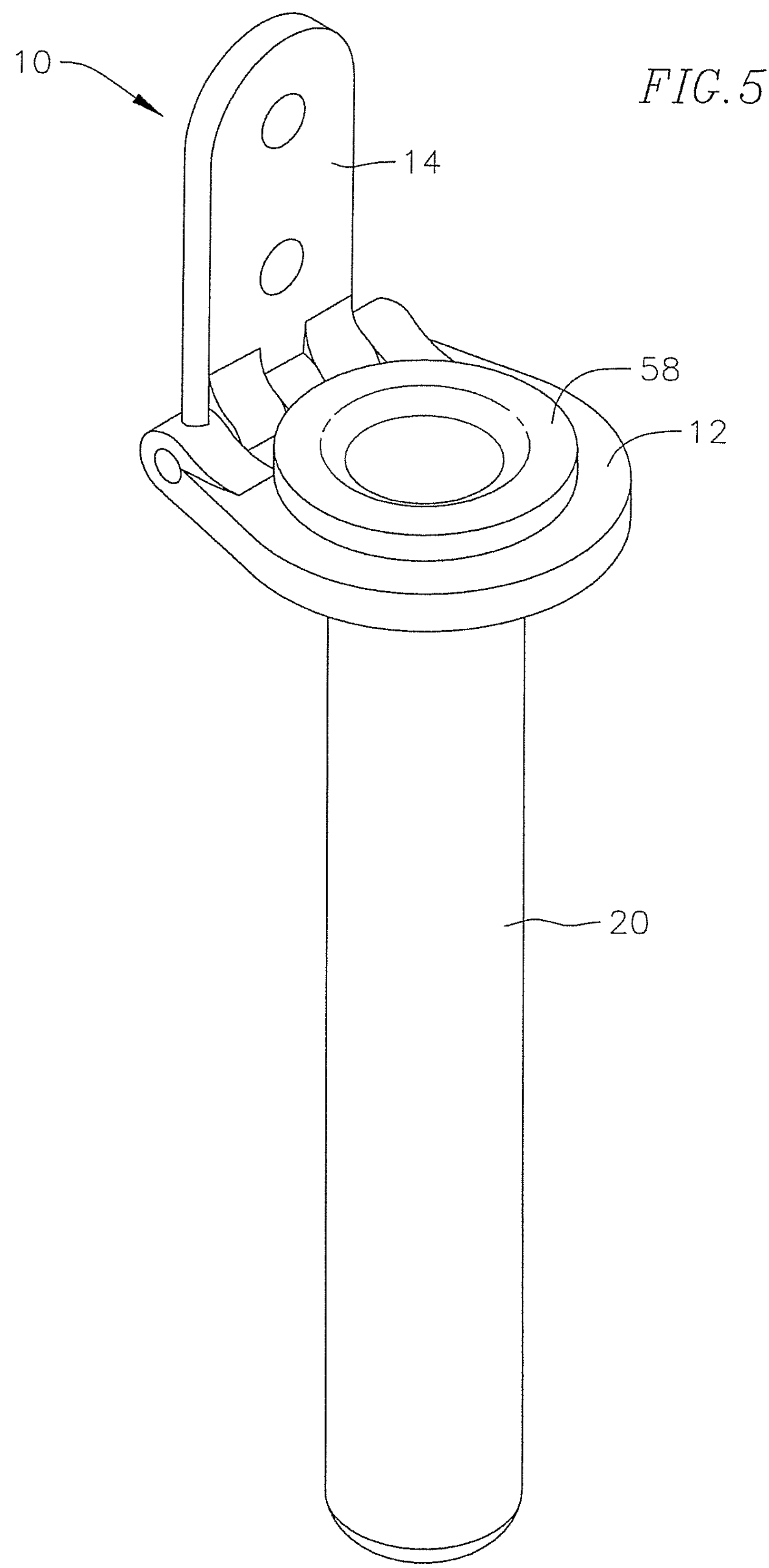
FIG. 5 is a perspective view of the lock of FIG. 1 coupled with a socket configured to receive a fence pole.

With reference now to FIGS. 1 and 2, a lock 10 includes a seat 12 and a lock plate 14 rotatably coupled together by a hinge pin 42. With reference also to FIG. 3, the seat 12 includes a generally flat body 16 having a partially rounded perimeter and a generally centrally-located opening 18 sized to encompass a socket 20 (FIG. 5). In one embodiment, the opening 18 may have a rounded or beveled edge 22 to guide a leading edge of the socket 20 more easily therethrough.

The seat 12 further includes a hinge portion 24 defined generally by a plurality of cylinders 26 spaced from each other, each of the cylinders having a hinge opening 28 extending therethrough. As shown, the seat 12 includes three cylinders 26, but the present invention is not limited to a specific number of cylinders and the seat may have one, two, or more than three cylinders.

The hinge openings 28 of each of the cylinders 26 of the hinge portion 24 are aligned with each other and sized to accommodate the hinge pin 42, as described in more detail below. As shown in the figures, the hinge portion 24 is integral as a single piece and made from the same material as the body 16 of the seat 12. In one embodiment, a diameter of the cylinders 26 is greater than a thickness of the seat 12, but the size of the cylinders is not limited thereto. Additionally, the hinge portion 24 may include an arc section 30 providing a smooth transition from the body 16. As will be appreciated, the specific structure of the hinge portion 24 is not limited as described above, but rather can be any structure that allows for the rotation of the seat 12 with respect to the lock plate 14. In one embodiment, the seat 12 is made from a nylon/glass composite wherein the glass makes up about 15% of the total weight of the composite. However, any suitable material may be used for the seat 12.

With reference to FIG. 2, a lower surface 32 of the seat 12 includes a groove 34 being substantially U-shaped and generally corresponding to a perimeter of the seat 12. The groove 34 allows the lock 10 to be as light as possible.

With reference now to FIG. 4, the lock plate 14 is a substantially flat plate configured to be rotatably coupled to the seat 12. In one embodiment, the lock plate 14 is generally U-shaped with the arc portion of the "U' being distal from the coupling of the lock plate and the seat 12. However, the specific shape of the lock plate 14 is not limited and the lock plate can be of any suitable shape. The lock plate 14 includes at least one fastener opening 44 configured to receive a fastener, such as a screw. As shown in the figure, the lock plate 14 has two fastener openings 44, but it will be appreciated that the lock plate could have only one or more than two openings.

Similarly to the seat 12, the lock plate 14 includes a hinge portion 36 including a plurality of cylinders 38 spaced from each other, each of the cylinders having a hinge opening 40 extending therethrough. In one embodiment, a diameter of the cylinders 38 is greater than a thickness of the lock plate 14, but the size of the cylinders is not limited thereto. As shown in the figures, the hinge openings 40 on the cylinders 38 are aligned and sized to receive the hinge pin 42. In one embodiment, the lock plate 14 is made from a nylon/glass composite wherein the glass makes up about 15% of the total weight of the composite. However, any suitable material may be used for the lock plate 14.

With reference again to FIG. 1, the seat 12 and the lock plate 14 are coupled together by aligning the hinge openings 28 on the seat 12 and the hinge openings 40 on the lock plate 14 and inserting the hinge pin 42 through the aligned openings. As shown in the figures, the cylinders 26 on the seat 12 and the cylinders 38 on the lock plate 14 are spaced such that they can be overlapped to align the openings 28, 40. Then, the hinge pin 42 can be inserted through the aligned openings 28, 40 to rotatably couple the seat 12 and the lock plate 14 together. In one embodiment, the hinge pin 42 is made from a relatively rigid material such as stainless steel, but it will be appreciated that the hinge pin could be made from any suitable material. Additionally, while the coupling and rotatability of the seat 12 and the lock plate 14 has been described in terms of a hinge pin, it will be appreciated that the seat and the lock plate could be otherwise rotatably coupled together, such as by a living hinge or any other suitable coupling.

Operation of the lock will now be described primarily with reference to FIGS. 5 and 6. As noted above, a socket 20 configured to accommodate a lower end of a fence pole 56 of a fence is inserted into a hole in the ground. The socket can be attached to the hole by, for example, an adhesive or friction. It will be appreciated that a "socket" could be used that is not within the hole, but rather is attached over the hole to a periphery of the hole on the ground, such as by an adhesive. In other words, the socket merely acts as a base to which the lock 10 can be attached to secure it to the ground. In one embodiment, the socket 20 includes a flange 58 at an upper end. The socket 20 is inserted through the opening 18 in the seat 12 so that the seat abuts the flange 58.

When the lock 10 and the socket 20 are coupled together, the socket can be inserted into a hole in the ground and then a fence pole 56 or a pin can be inserted into the socket. Typically, a pin extending from a lower end of a fence pole has a smaller diameter than the fence pole, and therefore, the lower end of the fence pole can rest on the flange of the socket or the seat. Because the lock plate 14 is spaced from a perimeter of the opening 18, the seat can accommodate the wider-diameter fence pole 56 and the lock plate can be coupled to the fence pole.

The fence pole 56 may include openings configured to receive a fastener, such as a screw. The lock plate 14 of the lock 10 can then be rotated such that the fastener openings 44 on the lock plate are generally aligned with the openings on the fence pole 56. A fastener 54 can then be inserted through the aligned openings to couple the lock 10 to the fence pole 56. Once the fastener 54 is inserted through the openings in the lock 10 and the fence pole 56, the fence pole is coupled to the socket 20 and therefore can be prevented from being removed the socket until the fasteners are removed. Although screws are shown as an example of the fasteners 54 in the figures, any suitable fastener may be used to couple the lock 12 to the fence pole 56.

When the fence is not in use or before it has been installed, the lock plate 14 of the lock 10 can be rotated downward onto the seat 12 so that it does not significantly protrude upward. As such, it is significantly less likely that the lock plate 14 will fracture or cause injury if it is stepped on or otherwise impacted. Additionally, rotatability of the lock plate 14 with respect to the seat 12 allows the lock 10 to be coupled to a fence pole that is angled from the ground.

Figures 6, 7:
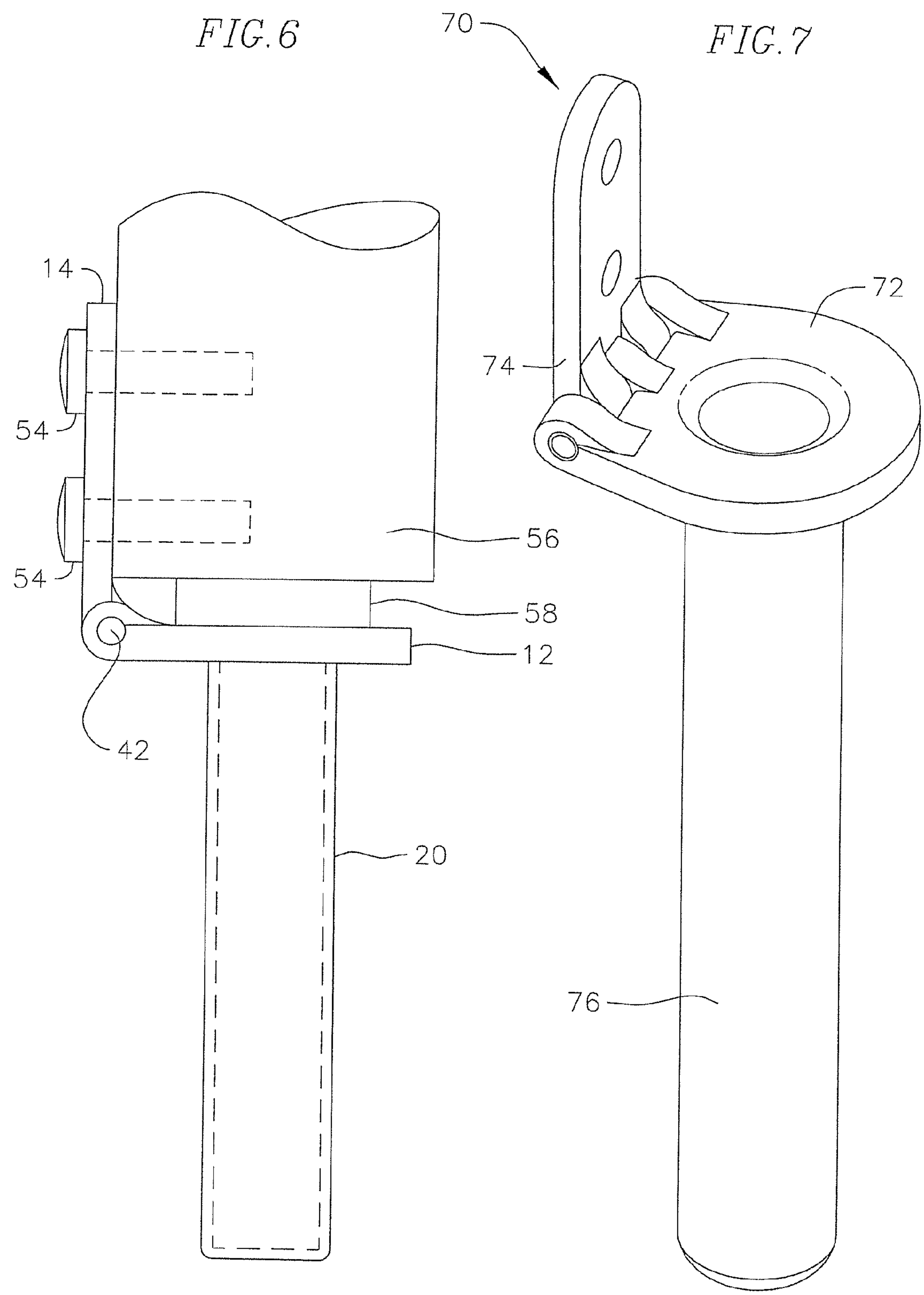
FIG. 6 is a schematic side view of the lock of FIG. 1 coupled to a fence pole.
FIG. 7 is a perspective view of another embodiment of a lock according to the present invention.
Figure 8:
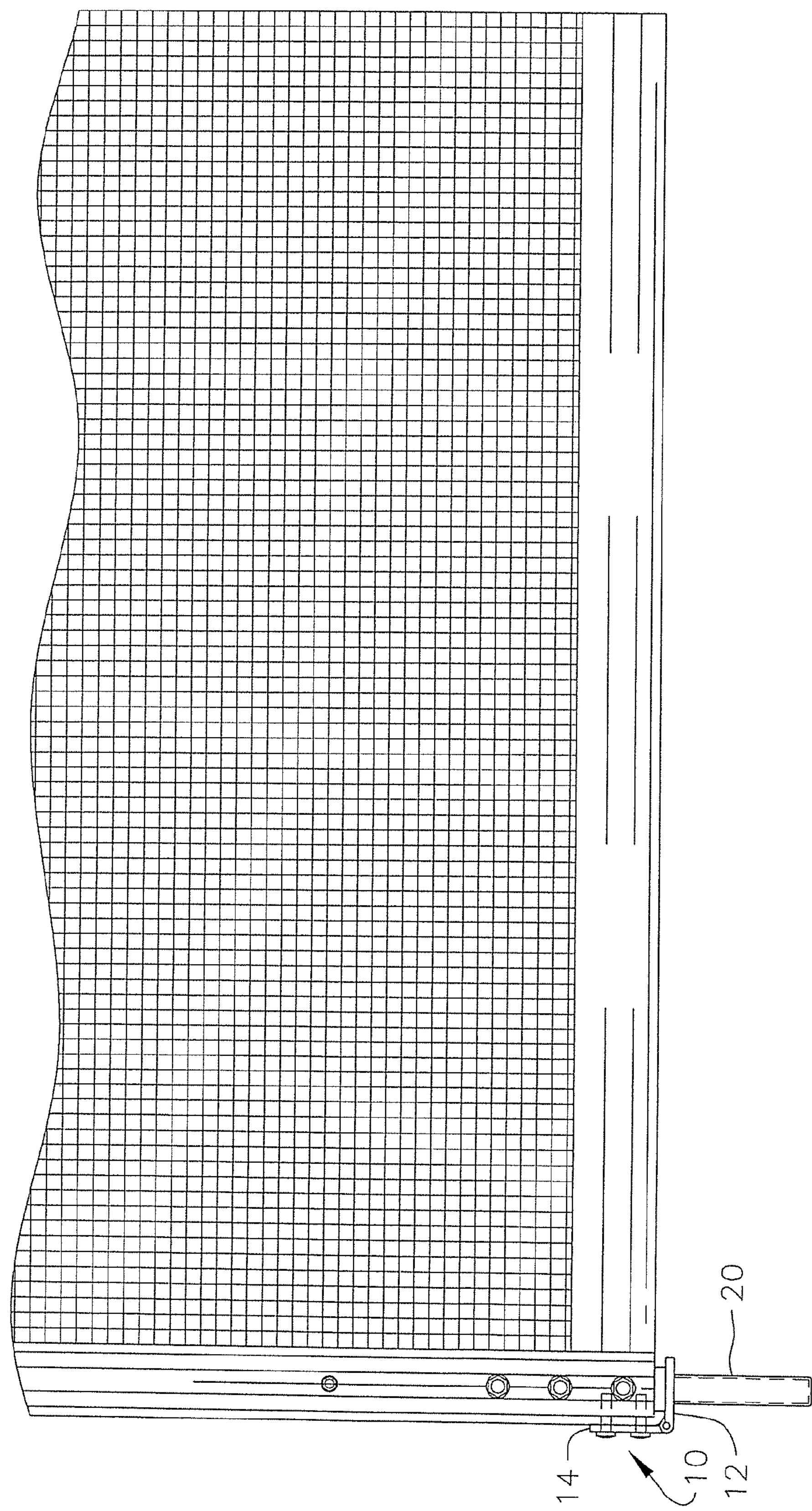
FIG. 8 is a schematic view of a fence incorporating a lock according to an embodiment of the present invention.

With reference now to FIG. 7, an embodiment of a lock 70 including a seat 12 and a lock plate 74 substantially similar to the seat 12 and lock plate 14 described above. Additionally, the lock 70 includes a socket 76 integral with the seat 12 such that the lock including the socket is one piece. In one embodiment, the seat 72 and the socket 76 are made from the same material and in another embodiment, the seat and the socket are made from different materials and are coupled together by, for example, an adhesive or another suitable fastener.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A fence comprising:

a plurality of fence poles;

a material tensioned between the fence poles;

at least one socket adapted for insertion into a hole in the ground, the socket having a flange for accommodating thereon a lower end of one of the fence poles, and having a body for receiving therein a fence pole pin extending from the lower end of the one of the fence poles; and a lock comprising a seat having an opening through which the at least one socket extends and a lock plate rotatably coupled to the seat and coupled to the one of the fence poles accommodated by the at least one flange, wherein the seat of the lock abuts against a bottom surface of the flange and completely encircles an upper end of the body of the socket.

2. The lock of claim 1, wherein the lock plate is coupled to the seat by a pin.

3. The lock of claim 2, wherein the seat and the lock plate each have a hinge portion, and wherein the pin extends through the hinge portion on the seat and the hinge portion on the lock plate.

4. The lock of claim 3, wherein the hinge portion on the seat and the hinge portion on the lock plate are substantially cylindrical and have a hinge opening extending therethrough.

5. The lock of claim 4, wherein the cylindrical section of the seat and the cylindrical section of the lock plate each have an outer diameter that is greater than a thickness of the seat and of the lock plate, respectively.

6. The lock of claim 1, wherein the lock plate and the fence pole are coupled together by a fastener.

7. The lock of claim 6, wherein the fastener is a screw.

8. The lock of claim 1, wherein the seat and the lock plate comprise the same material.

9. The lock of claim 1, wherein the seat and the lock plate comprise a glass and nylon composite.

10. A method for locking the fence of claim 1, the method comprising: inserting the socket through the opening in the lock; inserting the socket into the ground; inserting the fence pole pin into the body of the socket; and positioning the lower end of the one of the fence poles on the flange.

11. The method of claim 10, wherein coupling the lock plate to the the one of the fence poles comprises inserting a screw through a fastener hole in the lock plate and into a fastener opening in the fence.

* * * * *